US006702670B2

(12) United States Patent
Jasper et al.

(10) Patent No.: US 6,702,670 B2
(45) Date of Patent: Mar. 9, 2004

(54) METHOD AND APPARATUS FOR BONUS GAME SLOT MACHINE

(75) Inventors: Richard N. Jasper, Las Vegas, NV (US); Lawrence Zeidman, Culver City, CA (US)

(73) Assignee: L.A. Slot Machine Company, Inc., El Segundo, CA (US)

( * ) Notice: Subject to any disclaimer, the term of this patent is extended or adjusted under 35 U.S.C. 154(b) by 38 days.

(21) Appl. No.: 09/916,169

(22) Filed: Jul. 25, 2001

(65) Prior Publication Data

US 2003/0022713 A1 Jan. 30, 2003

(51) Int. Cl.[7] ................................ A63F 13/10
(52) U.S. Cl. ................................ 463/20; 273/143 R
(58) Field of Search ................................ 463/7, 16, 20, 463/21, 23; 273/445, 142 R, 142 H, 139

(56) References Cited

U.S. PATENT DOCUMENTS

| | | | | | |
|---|---|---|---|---|---|
| 4,200,291 | A | | 4/1980 | Hooker | 273/143 |
| 4,573,681 | A | * | 3/1986 | Okada | 463/21 |
| 5,067,712 | A | | 11/1991 | Georgilas | 273/143 |
| 5,255,915 | A | | 10/1993 | Miller | 273/85 |
| 5,704,835 | A | | 1/1998 | Dietz, II | 463/20 |
| 5,722,891 | A | | 3/1998 | Inoue | 463/20 |
| 5,848,932 | A | | 12/1998 | Adams | 463/20 |
| 5,980,384 | A | | 11/1999 | Barrie | 463/16 |
| 5,997,401 | A | | 12/1999 | Crawford | 463/20 |
| 6,033,307 | A | | 3/2000 | Vancura | 463/20 |
| 6,089,976 | A | | 7/2000 | Schneider et al. | 463/16 |
| 6,089,978 | A | | 7/2000 | Adams | 463/20 |
| 6,120,378 | A | | 9/2000 | Moody et al. | 463/20 |
| 6,126,541 | A | | 10/2000 | Fuchs | 463/13 |
| 6,142,873 | A | | 11/2000 | Weiss et al. | 463/20 |
| 6,155,925 | A | | 12/2000 | Giobbi et al. | 463/20 |
| 6,159,098 | A | | 12/2000 | Slomiany et al. | 463/25 |
| 6,270,408 | B1 | * | 8/2001 | Sakamoto et al. | 463/20 |

* cited by examiner

*Primary Examiner*—Henry C. Yuen
*Assistant Examiner*—Arnold Castro
(74) *Attorney, Agent, or Firm*—Christie, Parker & Hale, LLP

(57) ABSTRACT

A reel slot machine for playing a bonus game. A player plays a first game on the slot machine according to a first set of odds of winning. If the player wins, the player is given the opportunity to wager the player's winnings on a second "double-up" bonus game. If the user loses the bonus game, the player loses the winnings from the first game. If the player wins the bonus game, the player's winnings are doubled. The player can continue to play the bonus game until the player either loses a bonus game or takes the player's winnings.

23 Claims, 6 Drawing Sheets

(EXTERNAL FRONT VIEW)

(INTERNAL FRONT VIEW)

METHOD AND APPARATUS FOR BONUS GAME SLOT MACHINE

FIELD OF THE INVENTION

This invention relates generally to games of amusement involving chance or skill and more specifically to reel slot machines.

BACKGROUND OF THE INVENTION

A reel slot machine has a set of symbol bearing reels. A player inserts a value bearing token into the reel slot machine before playing the reel slot machine. Once the reel slot machine is activated, the reels rotate until they stop. In a gaming machine involving chance, the probability that the reels will stop in a winning combination of reel positions is based on internal software percentaging. In an amusement game involving skill, a player's skill in stopping the reels determines whether or not the reels will stop in a winning combination. A player determines if the reel positions specify a winning combination by comparing the symbols on the reels to a "payline" defined across a viewing window superimposed on top of the reels.

Players typically find any game of amusement to be more enjoyable when the game of amusement includes a plurality of play modes and opportunities to win. This leads manufacturers of games of amusement to create games of amusement with ever more exciting play modes creating more opportunities to play and win the game of amusement. While players enjoy playing reel slot machines because the rotating reels provide an exciting visual display, it has proven difficult to add new play modes to a reel slot machine to create exciting new ways to play the reel slot machine. This is because the nature of the reels within the reel slot machine provides only a few possible ways to rotate the reels and have the reels come to rest in new winning combinations.

Previous attempts at adding new play modes to a reel slot machine have focused on either adding new styles of paylines or adding add-on accessories to the reel slot machine. Typical add-on accessories include linking a plurality of reel slot machines together to create a "progressive" playing mode, and adding another electronic or mechanical bonus game for additional amusement. All of these previous attempts at adding new features detract from the original game qualities of the reel slot machine by unduly altering the reel slot machine's play modes and add unwanted mechanical and electrical complexities.

The present invention provides a way to add additional game play modes to a reel slot machine without adding to the complexity of the reel slot machine or detracting from the reel slot machine's original game qualities. Furthermore, the invention provides for other useful features.

SUMMARY OF THE INVENTION

In one aspect of the invention, a method for playing a reel slot machine including a set of reels is provided. The method includes playing a current game by spinning the first set of reels or a first subset of reels selected from the set of reels. The probability of a player winning the current game is determined by a first set of odds. The player is provided the option to play a bonus game if the player wins the current game or continue playing the bonus game if the current bonus game is won. The bonus game is played by spinning a second subset including one or more reels selected from the set of reels. The player's probability of winning the bonus game is determined by a second set of odds. In one embodiment of the method the player is provided an option to play a subsequent bonus game each time the player wins a bonus or subsequent bonus game. The method is applicable to mechanical reel and video reel slot machines.

In another aspect of the invention, a method is provided for playing a reel slot machine including a set of reels and a set of skill stop buttons operable to stop rotation of the set of reels. The method includes playing a current game by spinning the set of reels and a player wins the current game by stopping the set of reels in a winning combination using the set of skill stop buttons. The player is provided an option to play a bonus game if the player wins the current game. The bonus game is played by spinning a reel selected from the set of reels and the player wins the bonus game by stopping the reel in a winning position using a skill button operable to stop the reel. The player may also be provided an option to play a subsequent bonus game each time the player wins a bonus game or subsequent bonus game. The method is applicable to mechanical reel and video reel slot machines.

In another aspect of the invention, a data processing system is adapted to operate a reel slot machine including a set of reels and a set of skill stop buttons operable to stop rotation of the set of reels. The, data processing system includes a processor and a memory operably coupled to the processor. The memory has program instructions stored therein and the processor is operable to execute the program instructions. The program instructions include playing a current game by spinning the set of reels, the probability of a player winning the current game determined by a first set of odds. The program instructions further include providing an option to the player to play a bonus game if the player wins the current game and the bonus game is played by spinning a subset of reels selected from the set of reels, with the probability of the player winning the bonus game in any range from zero to 100% odds and in one embodiment, averaging between the 40% and 60% range. The program instructions may further include providing an option to the player to play a subsequent bonus game each time the player wins a bonus or subsequent bonus game.

BRIEF DESCRIPTION OF THE DRAWINGS

These and other features, aspects, and advantages of the present invention will become better understood with regard to the following description and accompanying drawings where.

DETAILED DESCRIPTION OF THE INVENTION

Figure 1:
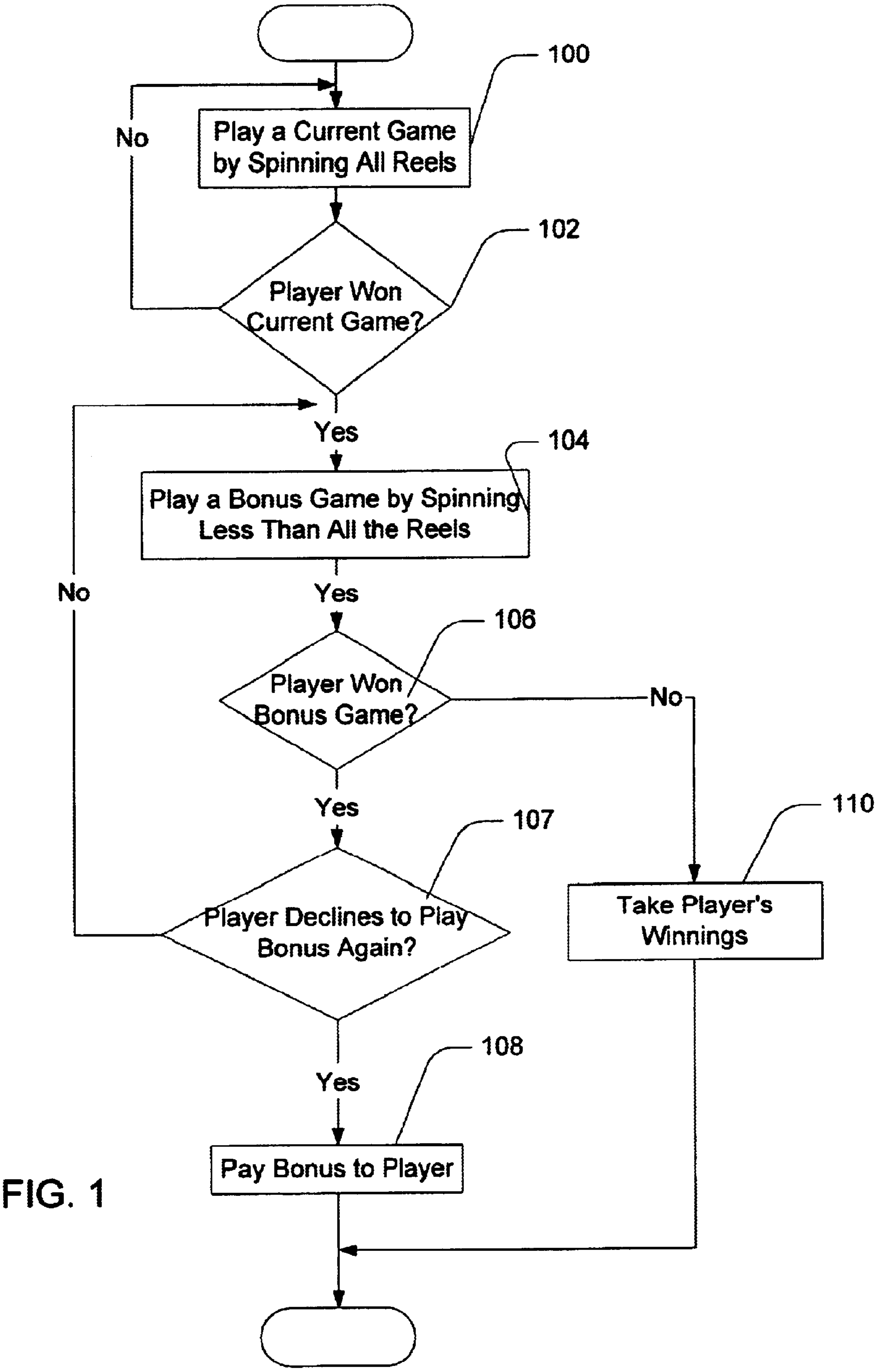
FIG. 1 is a process flow diagram depicting a game played using an embodiment of a reel slot machine according to the present invention.

FIG. 1 is a process flow diagram depicting an embodiment of a reel slot machine according to the present invention. A player plays a current game on a reel slot machine at step 100 according to a first set of odds of winning. The current game includes spinning all of the reel slot machine's reels. The reel slot machine determines if the player has won the current game at step 102 using the first set of odds of winning. If the player has won the current game, the player is given a chance to play a bonus game by spinning at one or more of the reels but not all of the reel slot machine's reels according to a second set of odds of winning at step 104. The reel slot machine determines if the player has won the bonus game at step 106. If the player wins the bonus game, the player is credited with a bonus according to the second set of odds. If the player loses the bonus game, the player's winnings, including any winnings from the current game and any bonuses from any previously won bonus games during that round of play, are lost and deducted by the reel slot machine at step 110. If the player wins the bonus game, the player may chose at step 107 to play the bonus game again. If the player does not play the bonus game again, the player is paid a bonus 108 in addition to the winnings from the current game. The bonus game odds percentaging for "chance" play can be expressed in any percentage range from zero percent up to, and including, 100%. In one embodiment of a reel slot machine according to the present invention, the game odds are in the range of 40% to 60%.

Figure 2:
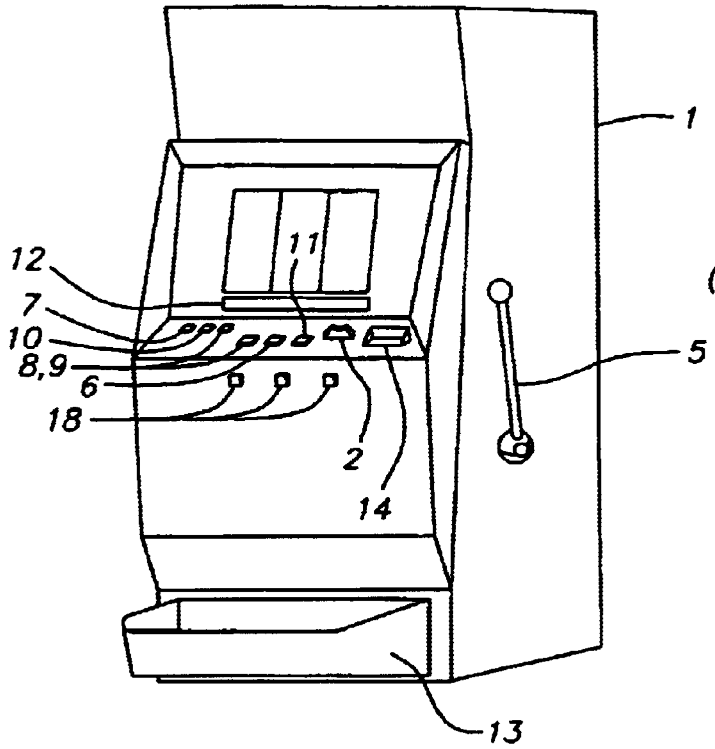
FIG. 2 is an outside perspective view of an embodiment of a reel slot machine according to the present invention.

FIG. 2 is an outside perspective view of an embodiment of a reel slot machine according to the present invention. An enclosure 1 houses components included in the reel slot machine. An exterior surface of the enclosure serves as a mounting surface for a plurality of player input and output devices. A value bearing token entry mechanism 2 permits a player to insert a value bearing token into the reel slot machine, thus allowing the reel slot machine to be activated by a player. A handle or arm 5 movably mounted on the exterior surface of the enclosure and a spin button 6 fixedly mounted on the exterior surface of the enclosure are both operable to initiate a game on the reel slot machine. A bonus game button 11 fixedly mounted on the exterior surface of the enclosure is operable to initiate a bonus game on the reel slot machine. In an embodiment of a reel slot machine used for entertainment games of skill, a set of skill stop buttons 18 fixedly mounted on the exterior surface of the enclosure are operable to stop reels included in the reel slot machine from rotating.

The number of skill stop buttons is dependent on the designer of the reel slot machine as is the operation of the skill stop buttons. In one embodiment of a reel slot machine according to the present invention, there is a skill stop button for each member of a set of reels included in the reel slot machine. In one embodiment of a reel slot machine according to the present invention, there is only a single skill stop button operable to stop each member of a set of reels sequentially as the skill stop button is pressed.

The enclosure further includes features that add to the reel slot machine's ease of use. An alphanumeric display 12 fixedly mounted in a conspicuous manner on the exterior surface of the enclosure is operable to indicate the number of player credits, winnings, and others displayable messages such as game playing instructions. In one embodiment of a reel slot machine according to the present invention, the alphanumeric display is fixedly mounted within the enclosure and a window is provided for viewing the alphanumeric display. A panel of buttons fixedly mounted on the exterior surface of the enclosure includes a cash out button 10 operable by a player to collect winnings, bet buttons 8 and 9 operable by a player for entering a number of credits to bet, and a service call button 7 operable by a player to call an attendant for assistance. A coin bowl 13 fixedly mounted on the exterior surface of the enclosure holds value bearing tokens dispensed by the reel slot machine. A bill validation unit 14 fixedly mounted on the exterior surface of the enclosure accepts paper value bearing tokens and determines the value of the paper tokens.

Figure 3:
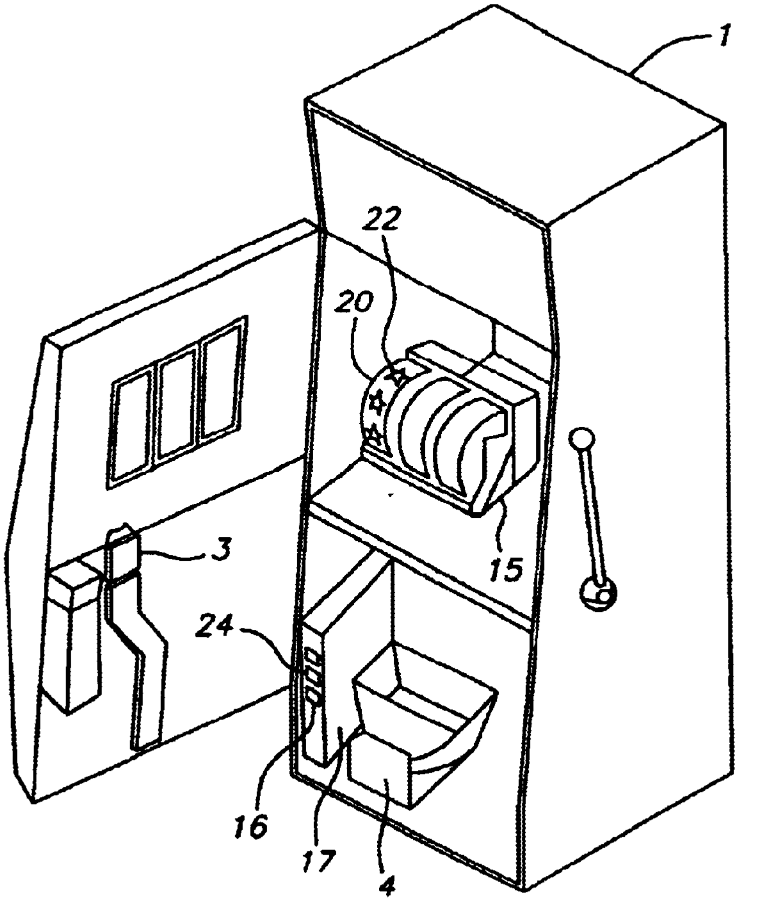
FIG. 3 is an inside perspective view of an embodiment of a reel slot machine according to the present invention.

FIG. 3 is an inside perspective view of an embodiment of a reel slot machine according to the present invention. A set of mechanical reels 15 are movably mounted within an enclosure 1 of a reel slot machine. The reels are fixedly attached to the rotors of stepper motors (not shown) that are operable to start the reels rotating, rotate the reels at various rates of speed, and to stop the reels at predetermined positions. The stepper motors are further operable to gradually increase or decrease the rotational speed of the reels to simulate reels with large inertial moments such as reels made of dense metals. Each reel includes a peripherally mounted viewing strip 20 including a plurality of symbols 22 for indicating the position of the reel when the reel is stopped. A data processing system 17 operably coupled to the stepper motors controls the operation of the reels. The data processing system is operably coupled to receive inputs from the plurality of player input devices mounted to the exterior surface of the enclosure and to transmit display signals to the alphanumeric display fixedly mounted on the exterior surface of the enclosure.

The enclosure further encompasses various devices that aide in the ease of use of the reel slot machine. Mechanical or "hard" meters 16 operably coupled to the data processing system display various bookkeeping aspects of the reel slot machine and cannot be reset by an operator of the reel slot machine. Electronic numeric or "soft" meters 24 operably coupled to the data processing system display specialized aspects of the reel slot machine and can be reset by the operator. A coin comparitor 3 or other coin discriminating device is operable to analyze value bearing tokens entered into the reel slot machine and reject counterfeit value bearing tokens without crediting the player. A hopper 4 operably coupled to the data processing system is operable to dispense value bearing tokens to a player.

In an alternative embodiment of a reel slot machine according to the present invention, the mechanical reels and stepper motors are replaced by graphical representations of reels displayed on a video screen. In this embodiment, the data processing system generates graphical image animation signals simulating the starting of rotation, spinning, and stopping of simulated reels for display on the video screen. The graphical image animation signals may include simulated rotations of the reels including simulated speeding up and slowing down of the rotational speed of represented reels.

Figure 4:
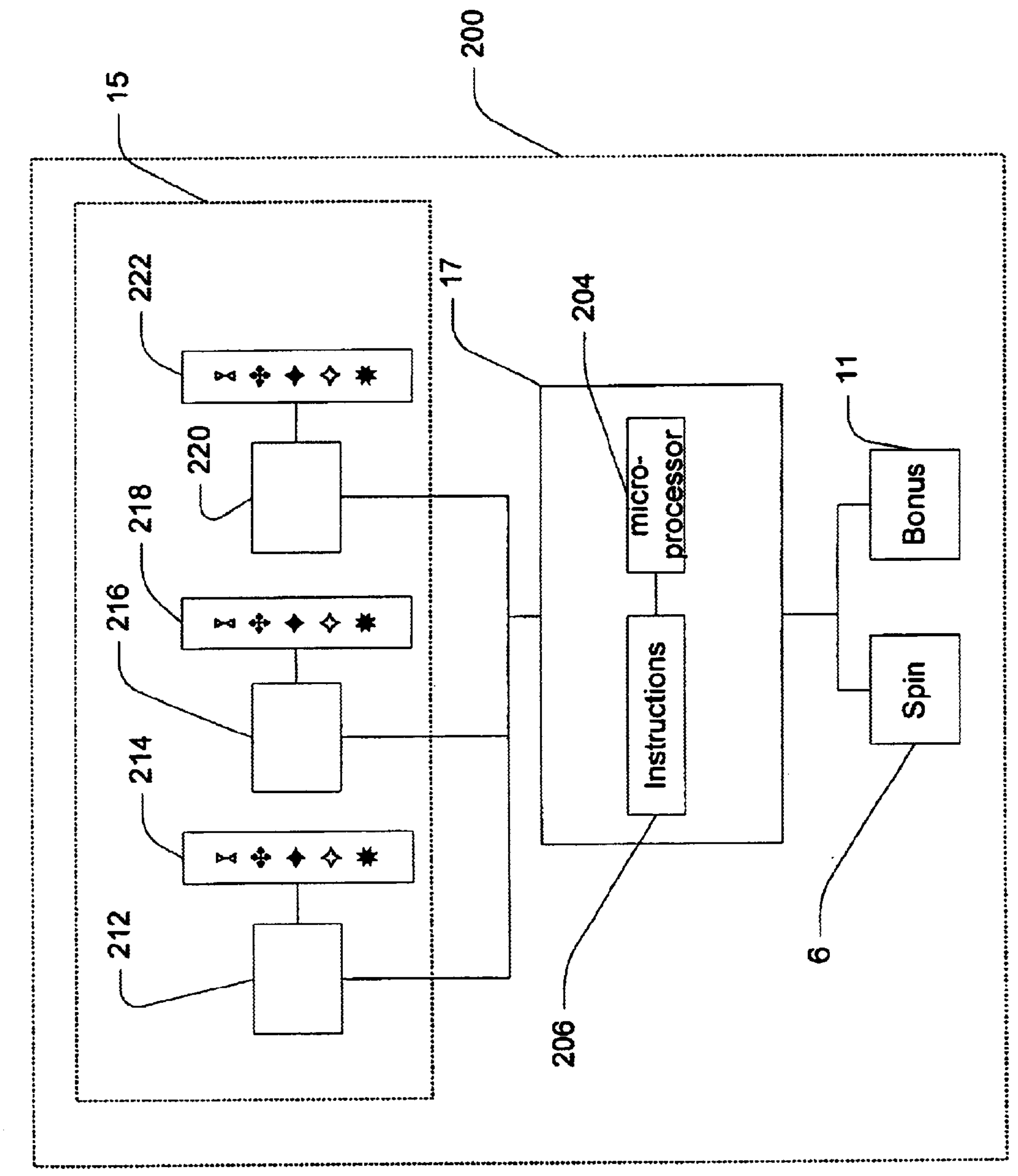
FIG. 4 is a diagram depicting the arrangement of functional components included in an embodiment of a reel slot machine according to the present invention.

FIG. 4 is a diagram depicting an arrangement of functional components included in an embodiment of a reel slot machine according to the present invention. The reel slot machine includes a previously described data processing system 17 including a microprocessor 204 and reel slot machine programming instructions 206 executable by the microprocessor to control the operations of the reel slot machine. The data processing system is operably coupled to previously described spin button 6 and bonus button 11. The data processing system is further operably coupled to each member of a set of mechanical reel and stepper motor combinations 15. Each mechanical reel is fixedly attached to a stepper motor. A first mechanical reel 214 is attached to a first stepper motor 212, a second mechanical reel 218 is attached to a second stepper motor 216, and a third mechanical reel 222 is attached to a third stepper motor 220.

In other embodiments of reel slot machines, the number of reels and number of buttons varies based on the taste of the designer of the reel slot machine. Although three reels are shown in the embodiment of FIG. 4, as few as two reels may be used or more than three reels may be used. For example, reel slot machines with four or five reels may readily be used.

Figure 5:
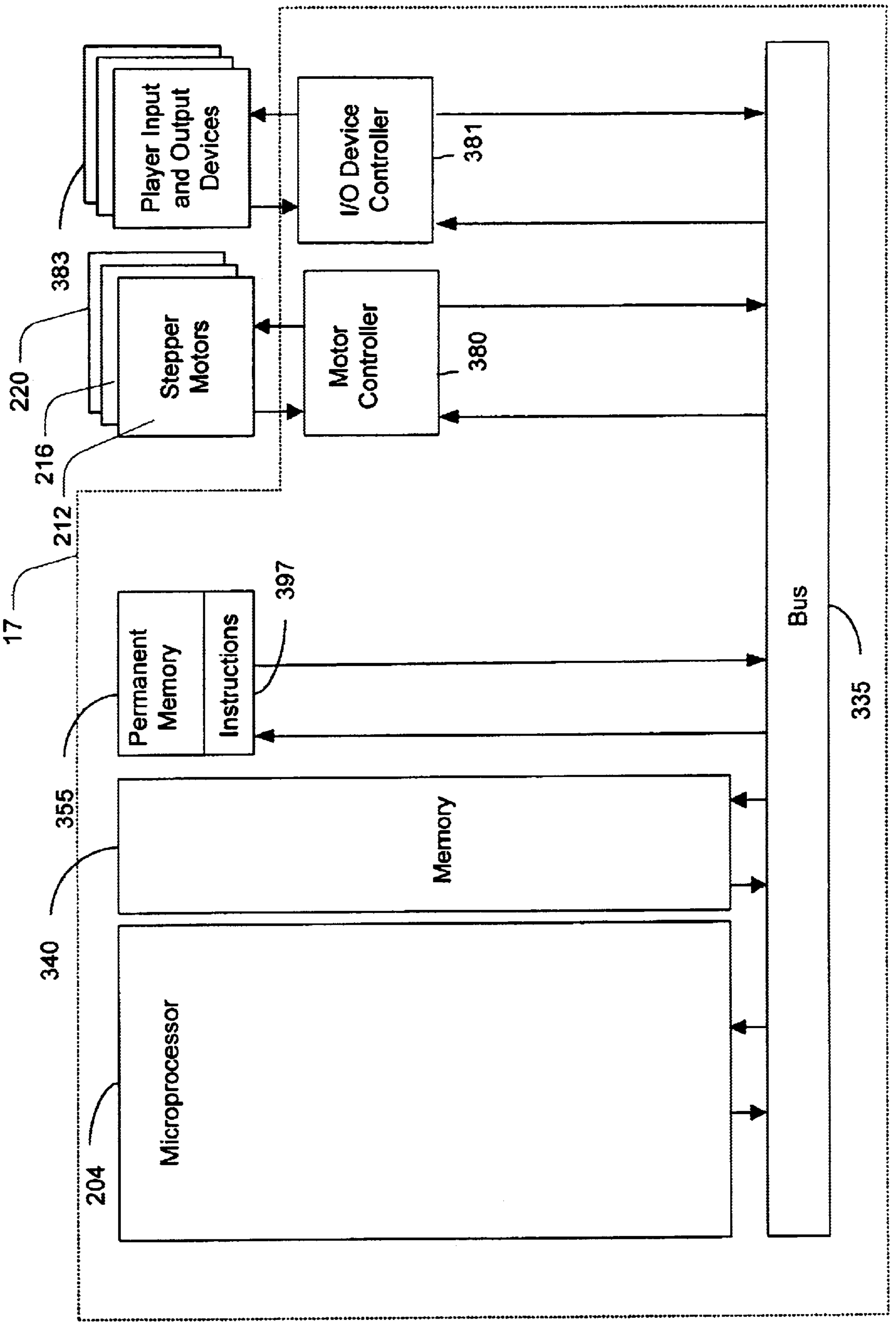
FIG. 5 is a diagram depicting an embodiment of a data processing system suitable for use in an embodiment of a reel slot machine according to the present invention.

FIG. 5 is a diagram depicting an embodiment of a data processing system suitable for use in an embodiment of a reel slot machine according to the present invention. An embodiment of a data processing system 17 suitable for use in a reel slot machine includes a microprocessor 204 operatively coupled via a system bus 335 to a plurality of memories including a main memory 340 and a permanent memory 355 such as a Read Only Memory (ROM). The microprocessor is further coupled via the system bus to a stepper motor controller 380 and a I/O device controller 381. The stepper motor controller is operably coupled to previously described stepper motors 212, 216, and 220. The I/O device controller is operably coupled to previously described player input and output devices 383.

Computer program instructions 397 implementing a reel slot machine are stored permanent memory device until the microprocessor retrieves the computer program instructions and stores them in the main memory. The microprocessor then executes the computer program instructions stored in the main memory to implement the features of an embodiment of a reel slot machine according to the present invention.

In operation, a player presses a spin button, transmitting a start signal to the data processing system via the I/O device controller and system bus. The data processing system selects a final position for a first subset of reels selected from the set of reels using a randomized selection method. The data processing system transmits a first set of control signals to the stepper motors via the system bus and the motor controller to initiate rotation of a first subset of reels. The data processing system transmits a second set of control signals to the stepper motors for a predetermined length of time. Finally, the data processing system transmits a third set of control signals to the stepper motors, eventually stopping the rotation of the first subset of reels at the selected final position. The process of selecting a final position of a reel using a randomized selection method, starting, rotating, and then stopping a reel at the selected final reel position after a predetermined length of time is herein termed a "spin" of a mechanical reel.

In an another embodiment of a reel slot machine according to the present invention, graphical representations of the reels are displayed on a video screen to simulate the rotation and stopping of mechanical reels to create a video reel slot machine. In operation, a player presses a spin button, transmitting a start signal to the data processing system. The data processing system selects a final position of the reels using a randomized selection method. The data processing system generates graphical image animation signals simulating the starting of rotation, spinning, and stopping of simulated reels. The data processing system transmits the graphical image animation signals to a video display thus simulating the rotation and stopping of reels for the player. The process of selecting a final position of a reel using a randomized selection method, generating a graphical image animation signals of starting, rotating, and then stopping a reel at the selected final reel position after a predetermined length of time is herein termed a "spin" of a simulated reel displayed on a video game.

In either a mechanical reel slot machine or a video reel slot machine the player presses a bonus button, transmitting a bonus signal to the data processing system via the I/O device controller and system bus in order to initiate a bonus game. The data processing system then spins a second subset of the set of reels as previously described to play the bonus game.

Figure 6:
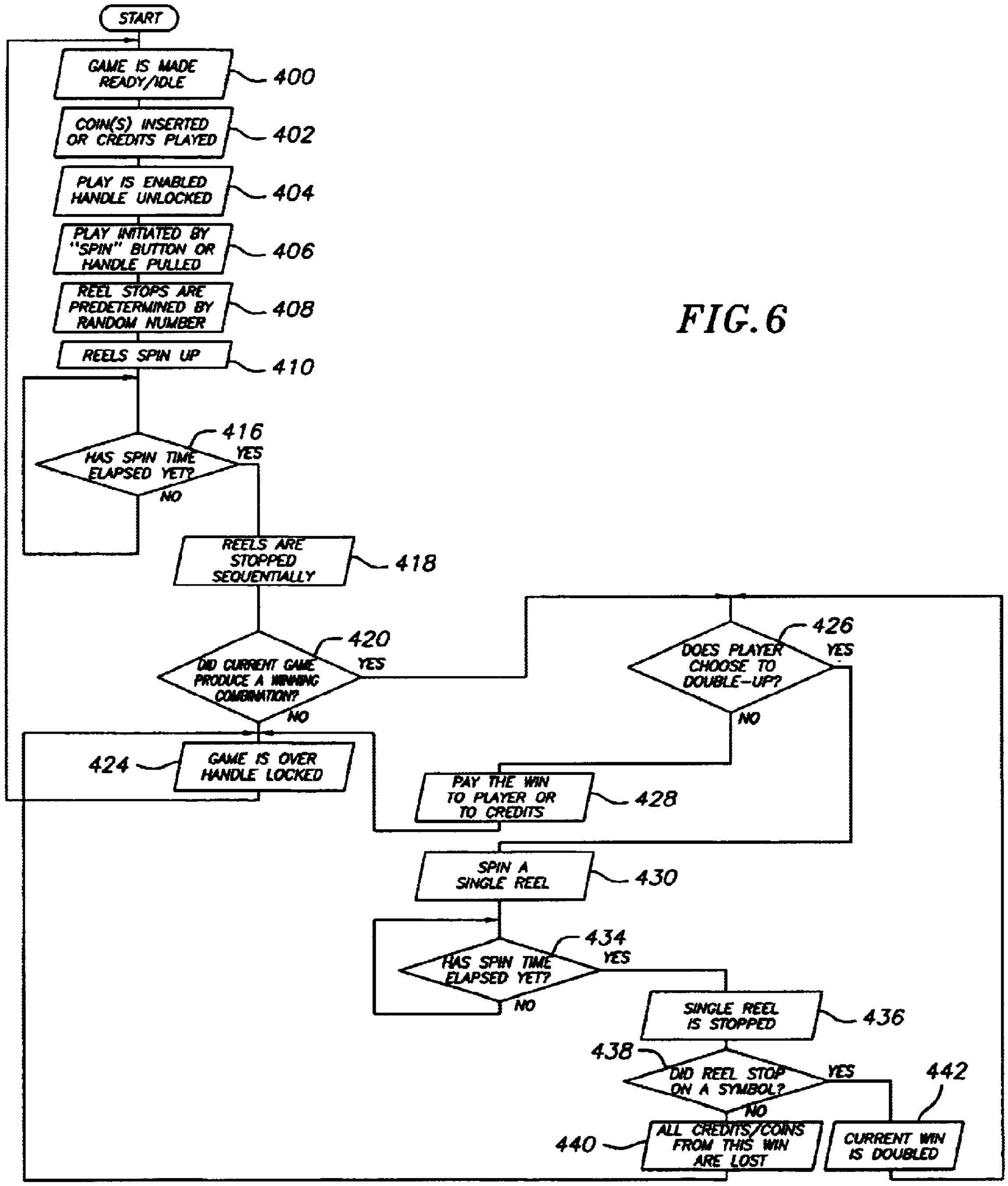
FIG. 6 is a process flow diagram depicting the sequence of operations within an embodiment of a reel slot machine according to the invention.

Various embodiments of amusement games may be realized by modification of the computer program instructions implementing control logic for a reel slot machine. FIG. 6 is a process flow diagram depicting the sequence of operations within an embodiment of a reel slot machine according to the invention. The sequence of operations describe a "double up or take win" feature. At step 400, the reel slot machine initializes itself and waits for a player to either enter value bearing tokens for credit or chose to play using existing credits. At step 402, the reel slot machine accepts value bearing tokens from a player and credits the player according to the aggregate value of the value bearing tokens. At step 404, a current game is enabled and the reel slot machine prepares to receive start signals from the previously described handle or spin button. At step 406 the player pulls the handle or presses the spin button to initiate the current game.

At step 408, the reel slot machine selects current game reel final positions for the reels using a randomized selection method. The current game reel final positions are selected by first determining if the player has won the current game by using a first randomly generated number and a first probability function, then current game final reel positions are selected to reflect whether or not the player has won the current game. At step 410 the reel slot machine transmits a first set of stepper motor signals to the previously described stepper motors, thus starting rotation of the reels. At step 410 the reels come to full rotational speed. At step 416 the reel slot machine determines if a predetermined spin time has elapsed. If the predetermined spin time has not elapsed, the reel slot machine loops until the predetermined spin time has elapsed while transmitting a second set of stepper motor signals to the stepper motors. If the predetermined spin time has elapsed, the reel slot machine transmits a third set of stepper motor control signals to the stepper motors and stops the reels at the selected final reel positions at step 418.

At step 420, the reel slot machine determines if the player has won the current game. If the player lost the current game, the reel slot machine disables the handle and spin buttons and returns to step 400 to wait for the player to initiate a new game.

If the player has won the current game, the reel slot machine gives the player a choice of playing a bonus game at step 426. If the player chooses not to play the bonus game, the reel slot machine pays the player the player's winnings from the current game at step 428 and continues processing at step 424.

If the player chooses to play a double-up bonus game, the reel slot machine spins a single reel at steps 430, 434, and 436. A bonus game final reel position is selected using a second randomly generated number and a second probability function. The reel slot machine determines if the player has won the bonus game at step 438. If the player has lost the bonus game, the reel slot machine takes the player's winnings and continues execution at step 424. If the player has won the bonus game, the reel slot machine credits the player for the bonus game win at step 442 and continues execution at step 426.

In one embodiment of a reel slot machine according the present invention, the probability of a player winning the previously described bonus game is in the range between about 0.4 and about 0.6.

Figure 7:
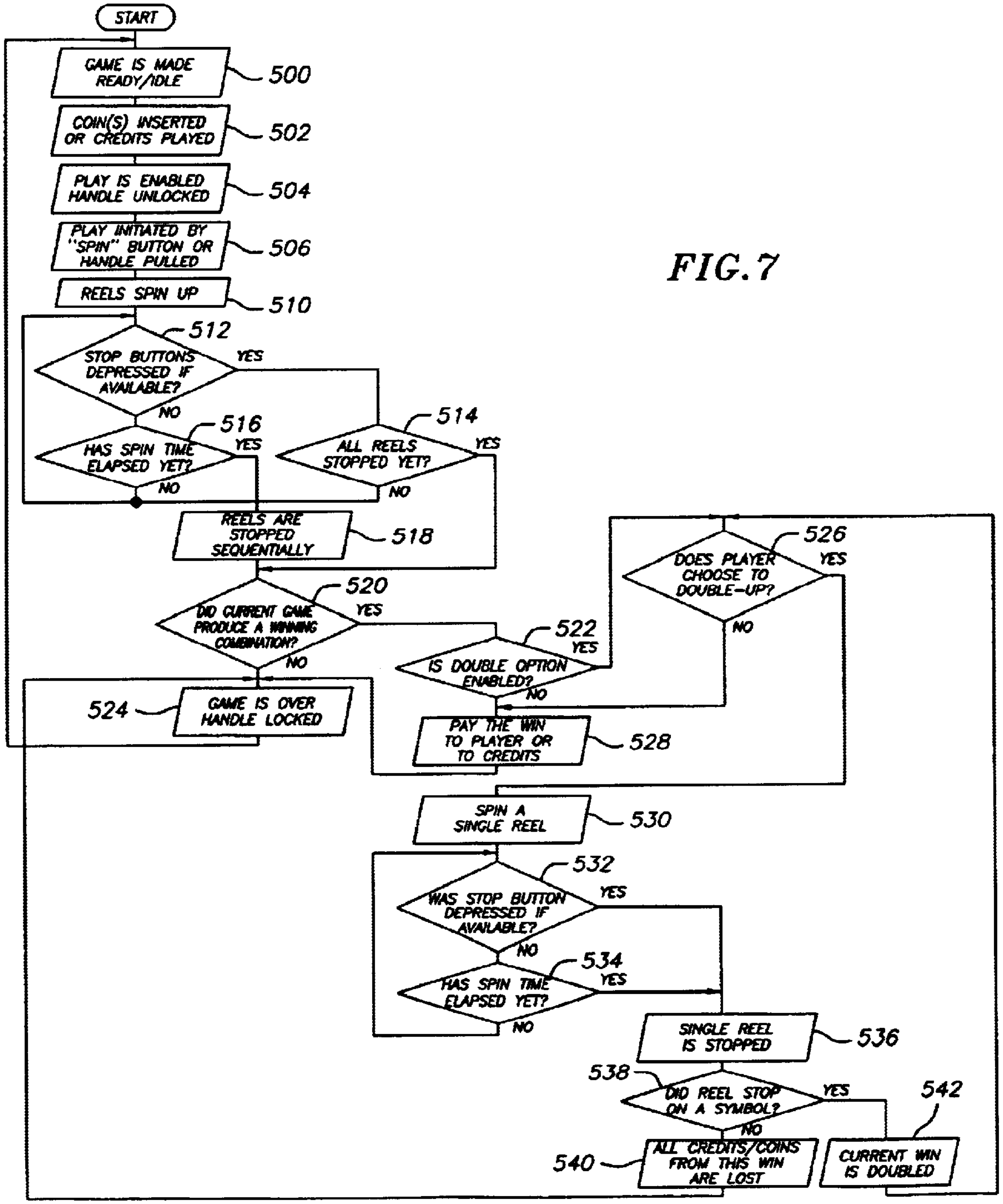
FIG. 7 is a process flow diagram depicting the sequence of operations within an embodiment of a reel slot machine according to the present invention wherein the reels are stopped by a player pressing skill stop buttons

FIG. 7 is a process flow diagram depicting the sequence of operations within an embodiment of a reel slot machine according to the present invention wherein the reels are stopped by a player pressing previously described skill stop buttons. At step 500, the reel slot machine initializes itself and waits for a player to either enter value bearing tokens for credit or chose to play using existing credits. At step 502, the reel slot machine accepts value bearing tokens from a player and credits the player according to the aggregate value of the value bearing tokens. At step 504, a current game is enabled and the reel slot machine prepares to receive start signals from the previously described handle or spin button. At step 506 the player pulls the handle or presses the spin button to initiate the current game.

At step 510, the reel slot machine transmits a first set of stepper motor signals to the previously described stepper motors, thus starting rotation of the reels. At step 510, the reels come to full rotational speed. At step 512, the reel slot machine determines if a skill stop button has been pressed by the player for one of the reels. If a reel stop button has been pressed, the reel slot machine stops the reel corresponding to the pressed skill button and determines if all the reels have been stopped at step 514. If some of the reels are still spinning, the reel slot machine continues processing at step 512.

At step 516 the reel slot machine determines if a predetermined spin time has elapsed. If the predetermined spin time has not elapsed, the reel slot machine loops until the predetermined spin time has elapsed or until the player has stopped all of the reels using the skill stop buttons while transmitting a second set of stepper motor signals to the stepper motors. If the predetermined spin time has elapsed, the reel slot machine transmits a third set of stepper motor control signals to the stepper motors and stops the reels at randomly selected final reel positions at step 518.

At step 520, the reel slot machine determines if the player has won the current game by stopping the reels in a winning combination. If the player lost the current game, the reel slot machine disables the handle and spin buttons and returns to step 500 to wait for the player to initiate a new game.

If the player has won the current game, the reel slot machine gives the player a choice of playing a bonus game at step 526. If the player chooses not to play the bonus game, the reel slot machine pays the player the player's winnings from the current game at step 528 and continues processing at step 524.

If the player chooses to play a double-up bonus game, the reel slot machine spins a single reel at steps 530, 532, 534, and 536. The reel slot machine determines if the player has won the bonus game at step 538 by analyzing the position of the stopped reel. If the player has lost the bonus game, the reel slot machine takes the player's winnings and continues execution at step 524. If the player has won the bonus game, the reel slot machine credits the player for the bonus game win at step 542 and continues execution at step 526.

In a skill based reel slot machine, the degree of difficulty needed to stop a reel at a specific position may be adjusted in a variety of ways. In one embodiment of a reel slot machine according to the present invention, the degree of difficulty in stopping a reel at particular location is adjusted by adjusting the rate of rotation of the reel. The faster the reel rotation, the more difficult it is to judge the proper time to press the skill button to stop the reel at a desired location. In one embodiment of a reel slot machine according to the present invention, the window of opportunity to stop a reel at a particular symbol is not strictly proportional to the number of symbols included on the wheel. For example, if a reel includes 24 symbols, some of the symbols may have a window of opportunity less than 1/24th of the rotational period of the reel, thus making those symbols more difficult to select. In one embodiment of a reel slot machine according to the present invention, the degree of difficulty in stopping a first subset of reels selected from the set of reels during a current game is different than the probability of stopping a second subset of reels selected from the set of reels during a bonus game.

Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by claims supported by this application and the claims' equivalents rather than the foregoing description.

What is claimed is:

1. A method for playing a reel slot machine including a set of reels, comprising:

playing a current game by spinning the set of reels, the probability of a player winning the current game determined by a first set of odds, the player credited with winnings if the player wins the current game; and providing an option to the player to play a bonus game if the player won the current game, the bonus game played by spinning a subset of reels selected from the set of reels, the probability of the player winning the bonus game determined by a second set of odds wherein the first set of odds and the second set of odds are different and wherein the player's winnings are taken if the player loses the bonus game and the player's winnings are increased if the player wins the bonus game.

2. The method of claim 1 wherein the subset of reels is a proper subset of the set of reels.

3. The method of claim 1 wherein the reel slot machine is a mechanical reel slot machine.

4. The method of claim 1 wherein the reel slot machine is a video reel slot machine.

5. The method of claim 1, further comprising providing an option to the player to play a subsequent bonus game each time the player wins a bonus game.

6. The method of claim 1 wherein the second set of odds is one in two.

7. The method of claim 6, wherein the player's winnings are increased by doubling.

8. A method for playing a reel slot machine including a set of reels and a set of skill stop buttons operable to stop rotation of the set of reels, comprising:

playing a current game by spinning the set of reels, a player winning the current game by stopping the set of reels in a winning combination using the set of skill stop buttons according to a first degree of difficulty; and providing an option to the player to play a bonus game if the player won the current game, the bonus game played by spinning a subset of reels selected from the set of reels, a player winning the bonus game by stopping the subset of reels in a winning position using the set of skill stop buttons according to a second degree of difficulty wherein the first degree of difficulty and the second degree of difficulty are different.

9. The method of claim 8 wherein the reel slot machine is a mechanical reel slot machine.

10. The method of claim 8 wherein the reel slot machine is a video reel slot machine.

11. The method of claim 8 wherein there is a one-to-one mapping between the set of skill stop buttons and the set of reels.

12. The method of claim 8 wherein there is only one member in the set of skill stop buttons.

13. The method of claim 8, further comprising providing an option to the player to play a subsequent bonus game each time the player wins a bonus game.

14. A data processing system adapted to operate a reel slot machine including a set of reels, comprising:

a processor; and a memory operably coupled to the processor and having program instructions stored therein, the processor being operable to execute the program instructions, the program instructions including:

playing a current game by spinning the set of reels, the probability of a player winning the current game determined by a first set of odds, the player credited with winnings if the player wins the current game; and providing an option to the player to play a bonus game if the player won the current game, the bonus game played by spinning a single reel selected from the set of reels, the probability of the player winning the bonus game being one in two wherein the player's winnings are taken if the player loses the bonus game and the player's winnings are doubled if the player wins the bonus game.

15. The data processing system of claim 14 wherein the reel slot machine is a mechanical reel slot machine.

16. The data processing system of claim 14 wherein the reel slot machine is a video reel slot machine.

17. The data processing system of claim 14, the program instructions further comprising providing an option to the player to play a subsequent bonus game each time the player wins a bonus game.

18. A data processing system adapted to operate a reel slot machine including a set of reels and a set of skill stop buttons operable to stop rotation of the set of reels, comprising:

a processor; and a memory operably coupled to the processor and having program instructions stored therein, the processor being operable to execute the program instructions, the program instructions including:

playing a current game by spinning the set of reels, a player winning the current game by stopping the reels in a winning combination using the set of skill stop buttons according to a first degree of difficulty;

providing an option to the player to play a bonus game if the player won the current game, the bonus game played by spinning a subset of reels selected from the set of reels, a player winning the bonus game by stopping the subset of reels in a winning position using the set of skill stop buttons according to a second degree of difficulty wherein the first degree of difficulty and the second degree of difficulty are different.

19. The data processing system of claim 18 wherein the reel slot machine is a mechanical reel slot machine.

20. The data processing system of claim 18 wherein the reel slot machine is a video reel slot machine.

21. The data processing system of claim 18 wherein there is a one-to-one mapping between the set of skill stop buttons and the set of reels.

22. The data processing system of claim 18 wherein there is only one member in the set of skill stop buttons.

23. The data processing system of claim 18, the program instructions further comprising providing an option to the player to play a subsequent bonus game each time the player wins a bonus game.

* * * * *